(No Model.)
W. H. COWDERY.
HAY FORK.
No. 294,587. Patented Mar. 4, 1884.
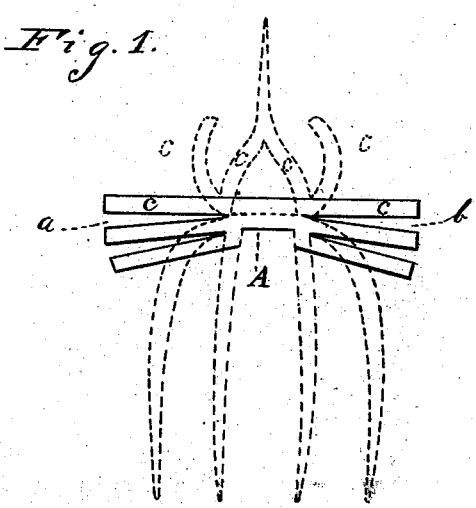
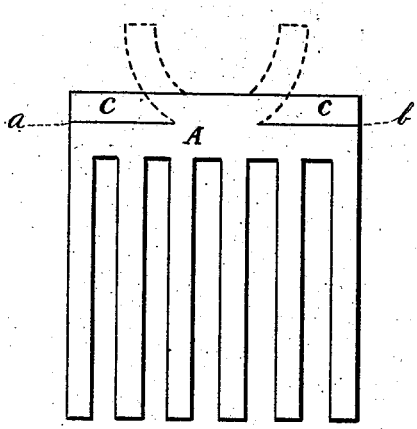
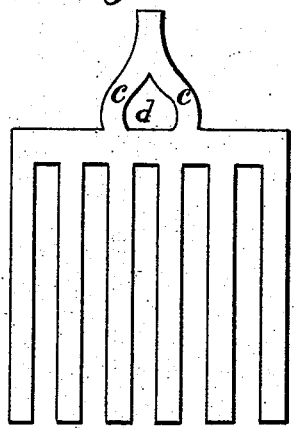
WITNESSES
C. H. Orer
W. E. Donnelly
Warren H. Cowdery INVENTOR
By Leggett & Leggett ATTORNEYS

UNITED STATES PATENT OFFICE.

WARREN H. COWDERY, OF ASHTABULA, OHIO, ASSIGNOR OF ONE-HALF TO SAMUEL R. HARRIS, OF SAME PLACE.

HAY-FORK.

SPECIFICATION forming part of Letters Patent No. 294,587, dated March 4, 1884.

Application filed May 20, 1882. (No model.)

*To all whom it may concern:*

Be it known that I, WARREN H. COWDERY, of Ashtabula, in the county of Ashtabula and State of Ohio, have invented certain new and useful Improvements in Hay-Forks; and I do hereby declare the following to be a full, clear, and exact description of the invention, such as will enable others skilled in the art to which it pertains to make and use the same.

My invention relates to forks, and more particularly to hay-forks, spading-forks, and coal-forks; and it consists in the peculiar construction of the same, as will be hereinafter fully set forth and claimed.

In the drawings, Figure 1 is a front elevation of a prepared blank for forming a hay or pitching fork. Fig. 2 is a front elevation of a spading-fork, showing the manner of shearing the head of the same from the ends toward the center, and bending the said sheared ends around, so as to form the shank. Fig. 3 is a front elevation of a complete fork.

A is a blank, which is sheared from its ends at $a$ and $b$ for a distance about one-third of its length, (more or less,) thus forming the two pieces $c\ c$, from which the shank is made, said pieces being first turned upward and then welded together; (see Fig. 3;) and a tang formed by drawing the welded end out, as shown in dotted lines, Fig. 1.

A shank formed as above mentioned adds to the strength of the fork, and also leaves a space, $d$, between the two arms $c\ c$ of the shank for the insertion of the toe in a spading-fork, which is very desirable, and being formed of the same piece with the fork, there is no liability of the shank becoming separated from the body of the fork.

I am aware that a plant-digger having two arms extending outwardly and upwardly from the upper corners of the blade, and connecting with a socket for the reception of a handle, is not new; also, that a rake having its head, teeth, shanks, and tang all in one piece of metal, the shanks being on a level with the top of the head, is old.

I am aware of patent to Smith, No. 221,624, November 11, 1879, which shows a rake with arms branching from the ends and united to form a tang, which is bent at nearly right angles to the teeth. In my former patent of May 24, 1881, I described a rake with a tang made in a manner similar to that of making the tang in the present invention, but bent at right angles to the teeth. In the present invention the metal which forms the tang is bent upward, and the tang, when completed, is substantially in line with the teeth.

What I claim is—

A fork having its tang composed of two branches integral with and extending upward from the back of the fork, substantially in line with the tines, then united to form a single tang, leaving an aperture, $d$, between the branches of the tang, as and for the purposes set forth.

In testimony whereof I have signed my name to this specification in the presence of two subscribing witnesses.

WARREN H. COWDERY.

Witnesses:
 E. J. GRIFFIN,
 H. M. POMEROY.